United States Patent
Gao

(10) Patent No.: US 9,977,621 B2
(45) Date of Patent: May 22, 2018

(54) MULTIMEDIA DATA BACKUP METHOD, USER TERMINAL AND SYNCHRONIZER

(71) Applicant: ZTE CORPORATION, Guangdong (CN)

(72) Inventor: Yu Gao, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 222 days.

(21) Appl. No.: 15/037,403

(22) PCT Filed: May 29, 2014

(86) PCT No.: PCT/CN2014/078786
§ 371 (c)(1),
(2) Date: May 18, 2016

(87) PCT Pub. No.: WO2014/183711
PCT Pub. Date: Nov. 20, 2014

(65) Prior Publication Data
US 2016/0291874 A1    Oct. 6, 2016

(30) Foreign Application Priority Data
Nov. 19, 2013 (CN) .......................... 2013 1 0585624

(51) Int. Cl.
*G06F 3/00* (2006.01)
*G06F 3/06* (2006.01)
(Continued)

(52) U.S. Cl.
CPC ............ *G06F 3/065* (2013.01); *G06F 3/0619* (2013.01); *G06F 3/0683* (2013.01);
(Continued)

(58) Field of Classification Search
CPC ...... G06F 3/065; G06F 3/0619; G06F 3/0683; G06F 11/1448; G06F 11/1451; G06F 11/1458; G06F 17/30038; G06F 17/30047
(Continued)

(56) References Cited

U.S. PATENT DOCUMENTS 6,748,402 B1 *   6/2004 Reeves .............. G06F 17/30569
2006/0085483 A1*  4/2006 Mooney ............. G06F 17/30578
(Continued)

FOREIGN PATENT DOCUMENTS

| CN | 1972427 | 5/2007 |
|---|---|---|
| CN | 101304573 | 11/2008 |
| CN | 101911740 | 12/2010 |

OTHER PUBLICATIONS

International Search Report for PCT/CN2014/078786 dated Sep. 16, 2014, 4 pages.

*Primary Examiner* — Reba I Elmore
(74) *Attorney, Agent, or Firm* — Nixon & Vanderhye P.C.

(57) ABSTRACT

The present disclosure discloses a multimedia data backup method, a user terminal and a synchronizer. The method includes: triggering a first user operation, which is used for acquiring configuration data; displaying the configuration data in the display area in response to the first user operation, and selecting a backup mode from the configuration data; triggering a second user operation, which is used for executing data backup processing corresponding to the backup mode; and searching multimedia data corresponding to the backup mode in response to the second user operation, and backing up the multimedia data to the storage medium when it is detected that an amount of free storage space of the storage medium is matched with an amount of the searched multimedia data.

12 Claims, 3 Drawing Sheets

(51) Int. Cl.
*G06F 11/14* (2006.01)
*G06F 17/30* (2006.01)

(52) U.S. Cl.
CPC ...... *G06F 11/1448* (2013.01); *G06F 11/1451* (2013.01); *G06F 11/1458* (2013.01); *G06F 17/30038* (2013.01); *G06F 17/30047* (2013.01)

(58) Field of Classification Search
USPC ........ 711/154, 156, 158, 162, 202; 707/640, 707/644, 645, 647
See application file for complete search history.

(56) References Cited

U.S. PATENT DOCUMENTS

| | | | | |
|---|---|---|---|---|
| 2009/0131028 A1* | 5/2009 | Horodezky | ..... | H04M 1/274516 455/418 |
| 2011/0113073 A1* | 5/2011 | Chang | ...... | G06F 17/30286 707/803 |
| 2012/0078971 A1* | 3/2012 | Ma | ...... | H04M 1/2745 707/802 |
| 2013/0013647 A1* | 1/2013 | Zhou | ...... | G06F 11/1469 707/803 |
| 2014/0201279 A1* | 7/2014 | Turakhia | ...... | G06Q 10/10 709/204 |
| 2014/0222793 A1* | 8/2014 | Sadkin | ...... | G06F 17/3053 707/723 |

\* cited by examiner

MULTIMEDIA DATA BACKUP METHOD, USER TERMINAL AND SYNCHRONIZER

This application is the U.S. national phase of International Application No. PCT/CN2014/078786 filed 29 May 2014 which designated the U.S. and claims priority to CN Priority Application No. 201310585624.X filed 19 Nov. 2013, the entire contents of each of which are hereby incorporated by reference.

TECHNICAL FIELD

The present disclosure relates to data backup technologies, and particularly to a multimedia data backup method and a user terminal.

BACKGROUND

With wide application of smart user terminals such as cellphones, use of multimedia data in cellphones is getting mature day by day. In the past, only pure word information, such as names, addresses, telephone numbers and the like, of contact persons can be stored in cellphones. However, there are higher requirements for cellphones at present regarding contact person information, i.e. it is required to be capable of storing contact person head portrait, and even multimedia data such as videos, etc.

During implementing technical solutions in embodiments of the present disclosure, inventors of the present application found at least following technical problems existing in the prior art.

Only pure word information can be stored due to limitation of an existing contact person format (.vcf). Even if multimedia data such as limited contact person head portrait information are stored, a storage manner of the existing contact person format would cause problems such as contact person head portrait distortion, etc., so that user requirements cannot be met well. In addition, as most frequently-used information in cellphones, contact person information is required to be frequently backed up or transmitted, and then loss of the head portrait information may be caused in a transmission process, which would cause inconvenience to users. However, regarding this problem, there is no effective solution in the related art.

SUMMARY

In view of this, embodiments of the present disclosure provide a multimedia data backup method, a user terminal and a synchronizer, which at least solve the problem of being limited by contact person formats, so that multimedia data can be stored, and requirements of users for frequent backup and transmission can be met.

The technical solution in embodiments of the present disclosure is realized by that:

a multimedia data backup method, applied to a user terminal having a storage medium and including a display unit which has a display area, the method including:

triggering a first user operation, the first user operation being used for acquiring configuration data;

displaying the configuration data in the display area in response to the first user operation, and selecting a backup mode from the configuration data;

triggering a second user operation, the second user operation being used for executing data backup processing corresponding to the backup mode; and searching multimedia data corresponding to the backup mode in response to the second user operation, and when it is detected that an amount of free storage space of the storage medium is matched with an amount of the searched multimedia data, backing up the multimedia data to the storage medium.

Optionally, displaying the configuration data in the display area specifically includes: displaying the configuration data in a form of a function setting menu, where the multimedia data at least includes: contact person information, head portrait information corresponding to the contact person information, and a mapping relationship between the contact person information and the head portrait information.

Optionally, searching multimedia data corresponding to the backup mode in response to the second user operation, and when it is detected that an amount of free storage space of the storage medium is matched with an amount of the searched multimedia data, backing up the multimedia data to the storage medium specifically include:

in the case where the backup mode is a full backup mode, searching to obtain multimedia data including all contact person information, head portrait information corresponding to the contact person information, and a mapping relationship between the contact person information and the head portrait information; and reading the storage medium after the search is executed or when the search is executed, detecting whether the an amount of free storage space of the storage medium is matched with an amount of the multimedia data, and if the amount of free storage space is enough to back up data, backing up the multimedia data; otherwise, prompting that the amount of free storage space is not enough to back up data in the display area.

Optionally, searching multimedia data corresponding to the backup mode in response to the second user operation, and when it is detected that an amount of free storage space of the storage medium is matched with an amount of the searched multimedia data, backing up the multimedia data to the storage medium specifically include:

in the case where the backup mode is a selective backup mode, displaying a menu at a next level of the selective backup mode in the display area, and displaying all contact person information in a form of a list to a user;

acquiring an operation of ticking the contact person information by a user, and triggering a first instruction after it is detected that the operation is executed, the first instruction operation being used for executing data backup processing for conducting selective backup on the ticked contact person information;

in response to the first instruction, according to the ticked contact person information, searching to obtain multimedia data including the ticked contact person information, head portrait information corresponding to the contact person information, and a mapping relationship between the contact person information and the head portrait information; and reading the storage medium after the search is executed or when the search is executed, detecting whether the amount of free storage space of the storage medium is matched with the amount of the multimedia data, and if the amount of free storage space is enough to back up data, backing up the multimedia data; otherwise, prompting that the amount of free storage space is not enough to back up data in the display area.

Optionally, the method further includes: after the storage medium located in the user terminal is placed into the other user terminal, triggering a third user operation, the third user operation being used for selecting a contact person synchronization mode from the configuration data; and synchronizing the multimedia data backed up in the storage medium to the other user terminal in response to the third user operation, taking the contact person information in the multimedia data as newly added cellphone contact person information, and according to the mapping relationship between the contact person information and the head portrait information, executing mapping relationship matching on the contact person information and the head portrait information corresponding to the contact person information.

A user terminal, the user terminal having a storage medium and including a display unit which has a display area, the user terminal further including:

a first trigger unit configured to trigger a first user operation, the first user operation being used for acquiring configuration data;

a first response unit configured to display the configuration data in the display area in response to the first user operation, and select a backup mode from the configuration data;

a second trigger unit configured to trigger a second user operation, the second user operation being used for executing data backup processing corresponding to the backup mode; and a second response unit configured to search multimedia data corresponding to the backup mode in response to the second user operation, and when it is detected that an amount of free storage space of the storage medium is matched with an amount of the searched multimedia data, back up the multimedia data to the storage medium.

Optionally, the second response unit further includes:

a first processing subunit configured to in the case where the backup mode is a full backup mode, search to obtain multimedia data including all contact person information, head portrait information corresponding to the contact person information, and a mapping relationship between the contact person information and the head portrait information; and a first detection subunit configured to read the storage medium after the search is executed or when the search is executed, detect whether the amount of free storage space of the storage medium is matched with the amount of the multimedia data, and if the amount of free storage space is enough to back up data, back up the multimedia data; otherwise, prompt that the amount of free storage space is not enough to back up data in the display area.

Optionally, the second response unit further includes:

a second processing subunit configured to in the case where the backup mode is a selective backup mode, display a menu at a next level of the selective backup mode in the display area, and display all contact person information in a form of a list to a user;

a second detection subunit configured to acquire an operation of ticking the contact person information by the user, and trigger the first instruction after it is detected that the operation is executed, the first instruction operation being used for executing data backup processing for conducting selective backup on the ticked contact person information;

an instruction response subunit configured to search to obtain multimedia data including the ticked contact person information, head portrait information corresponding to the contact person information, and a mapping relationship between the contact person information and the head portrait information in response to the first instruction according to the ticked contact person information; and a third detection subunit configured to read the storage medium after the search is executed or when the search is executed, detect whether the amount of free storage space of the storage medium is matched with the amount of the multimedia data, and if the amount of free storage space is enough to back up data, back up the multimedia data; otherwise, prompt that the amount of free storage space is not enough to back up data in the display area.

When executing processing, the first trigger unit, the first response unit, the second trigger unit, the second response unit, the first processing subunit, the first detection subunit, the second processing subunit, the second detection subunit, the instruction response subunit and the third detection subunit may be implemented using a central processing unit CPU, a digital signal processor DSP or a field-programmable gate array FPGA.

A user terminal, the user terminal including a display unit which has a display area, the user terminal further including:

a synchronization trigger unit configured to trigger a third user operation after a storage medium in the user terminal for implementing data backup processing is placed into the present user terminal, the third user operation being used for selecting a contact person synchronization mode from the configuration data; and display the configuration data in the display area in a form of a function setting menu; and a synchronization response unit configured to synchronize the multimedia data backed up in the storage medium to the present user terminal in response to the third user operation, take the contact person information in the multimedia data as newly added cellphone contact person information, and according to the mapping relationship between the contact person information and the head portrait information, execute mapping relationship matching on the contact person information and the head portrait information corresponding to the contact person information.

When executing processing, the synchronization trigger unit and the synchronization response unit may be implemented using a central processing unit CPU, a digital signal processor DSP or a field-programmable gate array FPGA.

A synchronizer, including the above-mentioned two user terminals.

The method in embodiments of the present disclosure is applied to a user terminal having a storage medium and including a display unit which has a display area. The method includes: triggering a first user operation, the first user operation being used for acquiring configuration data; displaying the configuration data in the display area in response to the first user operation, and selecting a backup mode from the configuration data; triggering a second user operation, the second user operation being used for executing data backup processing corresponding to the backup mode; and searching multimedia data corresponding to the backup mode in response to the second user operation, and when it is detected that an amount of free storage space of the storage medium is matched with an amount of the searched multimedia data, backing up the multimedia data to the storage medium.

By means of the embodiment of the present disclosure, since no specific storage format limitation is involved in the backup process, only corresponding multimedia data backup processing is required to be executed according to backup modes in the configuration data, so that the multimedia data is stored in the storage medium of the user terminal. Therefore, embodiments of the present disclosure at least solve the problem of being limited by contact person formats, so that multimedia data can be stored, and requirements of users for frequent backup and transmission can be met.

DETAILED DESCRIPTION

Implementation of the technical solution will be described in detail below in combination with the figures.

Figure 1:
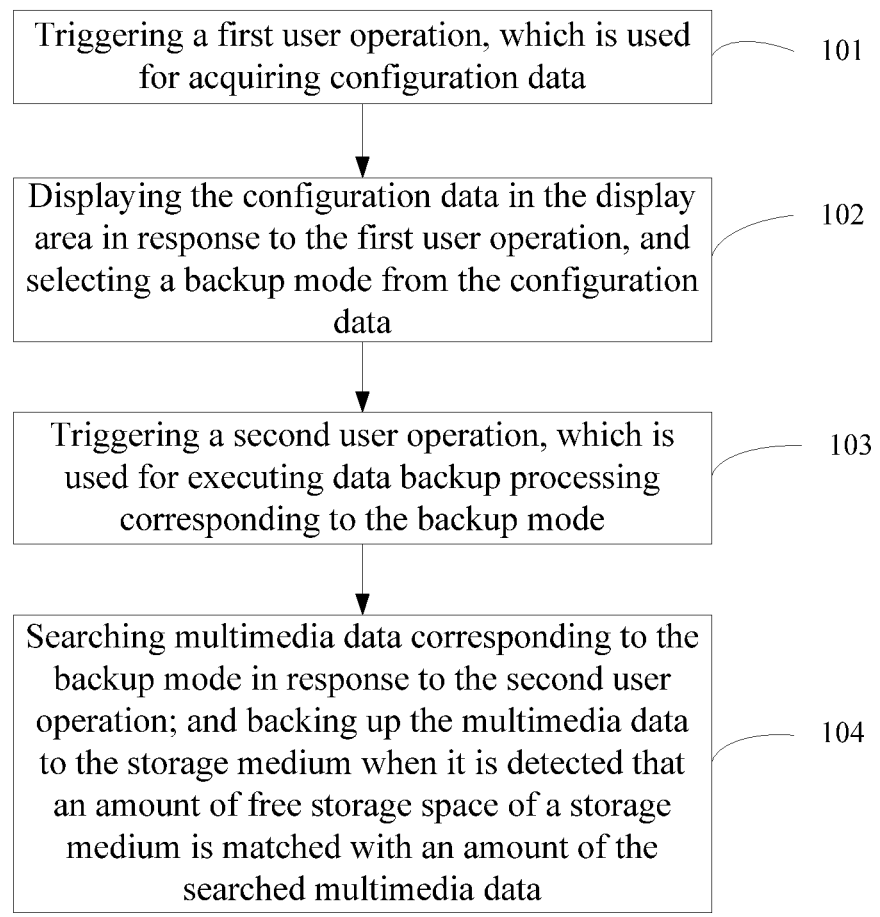
FIG. 1 is a flow diagram showing a principle implementation of a method of the present disclosure.

A multimedia data backup method of the present disclosure, applied to a user terminal having a storage medium and including a display unit which has a display area, as shown in FIG. 1, the method includes following steps.

Step 101. triggering a first user operation, which is used for acquiring configuration data;

Step 102. displaying the configuration data in the display area in response to the first user operation, and selecting a backup mode from the configuration data;

Step 103. triggering a second user operation, which is used for executing data backup processing corresponding to the backup mode; and Step 104. searching multimedia data corresponding to the backup mode in response to the second user operation; and backing up the multimedia data to the storage medium when it is detected that an amount of free storage space of a storage medium is matched with an amount of the searched multimedia data.

Here, the multimedia data refers to media composition elements which can be displayed to users, such as multimedia data mainly including text, pattern, image, sound, animation, video, etc. Multimedia data in embodiments of the present disclosure at least include: contact person information, head portrait information corresponding to the contact person information, and in addition, a mapping relationship between the contact person information and the head portrait information for facilitating execution of mapping and matching subsequently on the above-mentioned two information. Of course, multimedia data such as recorded video may also be included in addition to multimedia data such as head portraits as a picture type, and are not repeated herein in detail.

Figure 2:
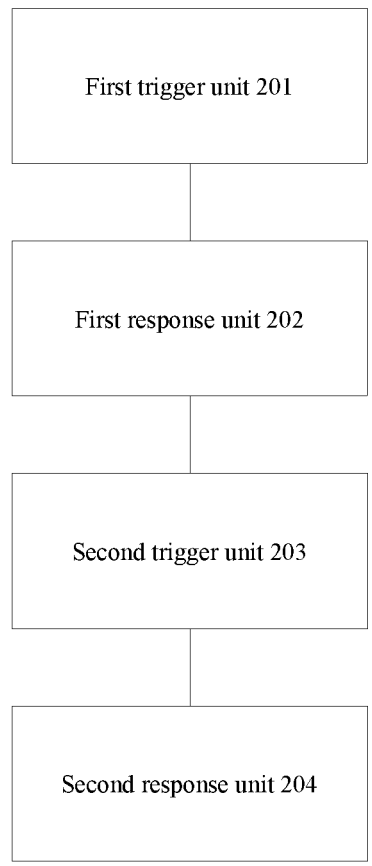
FIG. 2 is a structural diagram showing a basic composition of modules in a user terminal of the present disclosure.

A user terminal of the present disclosure, executing a data backup function, as shown in FIG. 2, includes following basic composition units. To distinguish from another user terminal which subsequently appears, the present user terminal is called a first user terminal here, and the other user terminal which subsequently appears is called a second user terminal, where the first user terminal and the second user terminal constitute a synchronizer, and the second user terminal may locally synchronize multimedia data backed up in a storage medium of the first user terminal, to update local multimedia data, which will be described in detail below. According to this description, the first user terminal has a storage medium and includes a display unit which has a display area, as shown in FIG. 2, the first user terminal further includes:

a first trigger unit 201 configured to trigger a first user operation, which is used for acquiring configuration data;

a first response unit 202 configured to display the configuration data in the display area in response to the first user operation, and select a backup mode from the configuration data;

a second trigger unit 203 configured to trigger a second user operation, which is used for executing data backup processing corresponding to the backup mode; and a second response unit 204 configured to search multimedia data corresponding to the backup mode in response to the second user operation, and back up the multimedia data to the storage medium when it is detected that an amount of free storage space of the storage medium is matched with an amount of the searched multimedia data.

A user terminal of the present disclosure, called a second user terminal to distinguish from the above-mentioned first user terminal, includes a display unit having a display area, the second user terminal further includes:

a synchronization trigger unit configured to trigger a third user operation after a storage medium in the first user terminal for implementing data backup processing is placed into the present user terminal; where the third user operation is used for selecting a contact person synchronization mode from configuration data, and the configuration data are displayed in the display area in a form of a function setting menu; and a synchronization response unit configured to synchronize the multimedia data backed up in the storage medium to the present user terminal in response to the third user operation, take the contact person information in the multimedia data as newly added cellphone contact person information, and execute mapping relationship matching on the contact person information and the head portrait information corresponding to the contact person information according to the mapping relationship between the contact person information and the head portrait information.

A synchronizer in embodiments of the present disclosure is composed of the first user terminal and the second user terminal. The first user terminal is used for backing up multimedia data to a local storage medium. After the storage medium is placed into the second user terminal, the second user terminal can locally synchronize the multimedia data backed up in the storage medium of the first user terminal, to update local multimedia data.

The present disclosure is specifically described by examples as follows.

An application scenario of the present disclosure is that: the user terminal is a smart cellphone, the storage medium storing multimedia data is an SD card, and an implementation solution of the present disclosure at this time is a solution for backing up contact person head portrait information in an original cellphone through the SD card, and is used for solving a problem that existing smart cellphones are limited by contact person format, so that multimedia data can be stored, and requirements of frequent backup and transmission of users can also be met, thereby avoiding head portrait information loss and distortion when the contact person information is backed up, and thus improving user experience.

An implementation solution of the present disclosure in this application scenario includes following contents.

I. Accessing to configuration data displayed in a form of a function setting menu in embodiments of the present disclosure first when a user needs to back up contact person information, and selecting a backup mode according to requirements, where the backup mode includes tow modes including "full backup" mode and "selective backup" mode.

II. Automatically searching contact person information and head portrait file information in the cellphone after the user selects the "full backup" mode, reading current free space of the SD card, backing up data if the space is enough, where backup content includes basic contact person information, a head portrait file and a mapping relationship between the head portrait file and corresponding contact person; and displaying that the free space of the SD card is not enough so as to prompt the user if the space is not enough.

III. accessing to a menu at a next level after the user selects the "selective backup" mode, so as to display an existing contact person list to the user, where the user ticks contact person information required to be backed up, and finally clicks "completion" to conduct selective backup, where a backup content type is as same as that in the full backup mode, and the user will also be prompted if the space of the SD card is not enough.

IV. After contact person information and contact person head portrait files and information need to be backed up in the cellphone are backed up in the SD card, the SD card may be taken out to be replaced into another smart cellphone by the user, and then a "contact person synchronization" mode in configuration data displayed in a form of a function setting menu in embodiments of the present disclosure is selected according to requirements; at this time, a new cellphone would automatically install the contact person information and related head portrait files and information backed up in the SD card in the new cellphone, so that a process of lossless transmission of contact person information and contact person head portrait information is completed.

In the above-mentioned contents, enabling a user to conduct operations in the modes of "full backup", "selective backup" and "contact person synchronization" is a main improvement point of embodiments of the present disclosure. To implement the solution of backing up and automatically synchronizing contact person information and contact person head portrait information in an original cellphone through an SD card in this application scenario, various units are required to be added into the cellphone for following specific implementation in embodiments of the present disclosure, which will be specifically described below in combination with the diagram of the function setting menu in FIG. 3 and the operation flow in FIG. 4 as follows.

Step S10. accessing to a function setting menu to select a backup mode.

Figure 3:
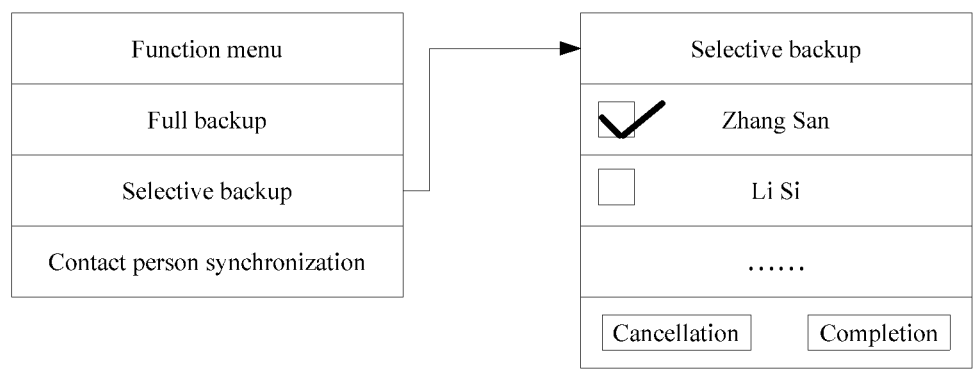
FIG. 3 is a schematic diagram showing a function menu in an application scenario of the present disclosure.
Figure 4:
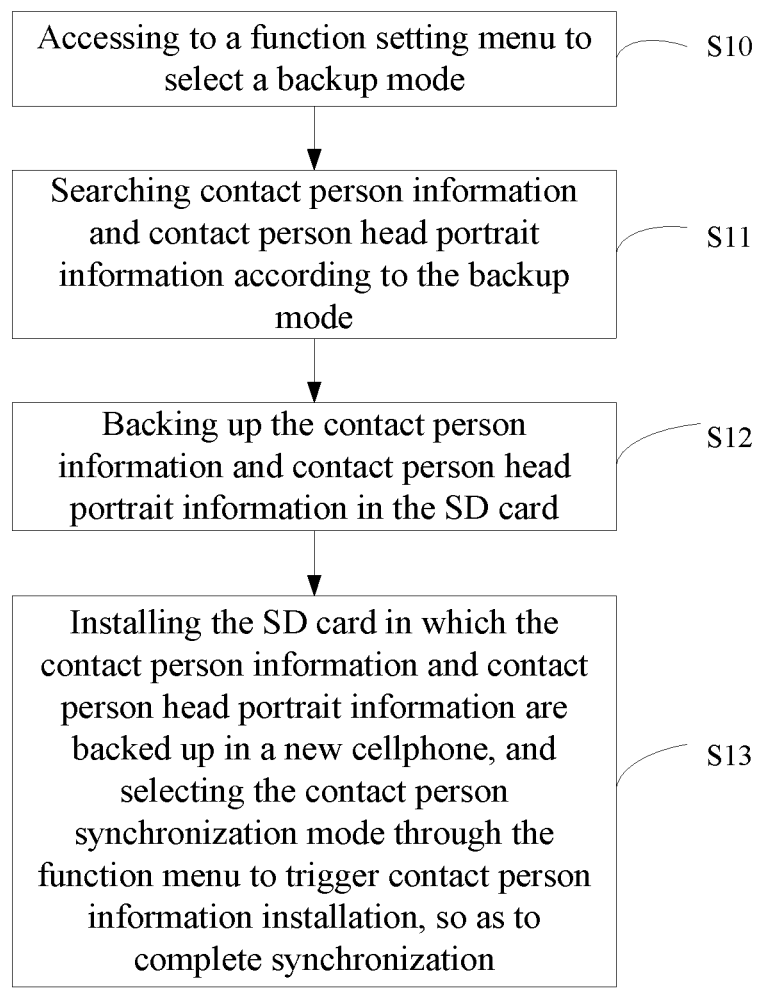
FIG. 4 is a flow diagram showing a method for backing up and automatically synchronizing contact person information and contact person head portrait information in an original cellphone through an SD card in an application scenario.

In this step, a function menu is required to be added to a setting interface of a cellphone, a structure of the menu is as shown in the diagram of the function setting menu in FIG. 3, in which a primary menu is provided with three options including full backup, selective backup and contact person synchronization. In step S10, a user needs to select the full backup mode or the selective backup mode as a backup mode, and all contact person information and contact person head portrait files and information are backed up in the SD card if the full backup mode is selected, where backup content mainly includes contact person word information, contact person head portrait files, and contact person head portrait mapping relationship; and accesses to a menu at a next level if the selective backup mode is selected, so that the user can select contact person information to be backed up through the menu and back up the contact person information in the SD card finally, where the backup manner is as same as that of full backup mode.

Step S11. searching contact person information and contact person head portrait information according to the backup mode.

This step mainly includes: according to the contact person information required to be backed up by the user, searching all contact person information, contact person head portrait file information and mapping relationship for backup in subsequent flows.

Step S12. backing up the contact person information and contact person head portrait information in the SD card.

In this step after step S11 is completed, the contact person information, the contact person head portrait file information and the mapping relationship searched in step S11 are backed up in the SD card, which includes backup of contact person information, and backup of contact person head portrait file and mapping relationship information thereof. A backup manner includes but is not limited to using xml files, txt files or other text format files to back up contact person word information and head portrait mapping relationship information; using picture formats such as JPEG, PNG, BMP and the like to back up head portrait file information; and a backup means for head portrait files includes but is not limited to directly saving picture files, zipping to save picture files, and grouping or classifying to zip picture files.

Step S13. installing the SD card in which the contact person information and contact person head portrait information are backed up in a new cellphone, and selecting the contact person synchronization mode through the function menu to trigger contact person information installation, so as to complete synchronization.

In this step after step S12 is completed, the user can replace the SD card in which the contact person information and contact person head portrait files and information are backed up in a new cellphone, and trigger through a contact person synchronization mode in the function setting menu in FIG. 3 to automatically install contact person information and head portrait information in the new cellphone. This process mainly includes: synchronizing the contact person word information in the backed up text file to the contact person information in the new cellphone; meanwhile, copying the backed up contact person head portrait files to a specific directory; and configuring head portrait file information according to the previously backed up contact person head portrait mapping relationship, to enable the head portrait file information to match the new contact person mapping relationship synchronized in the new cellphone, thereby completing synchronization.

If being implemented in a form of software function modules and sold or used as independent products, the integrated modules in embodiments of the present disclosure can also be stored in a computer readable storage medium. Based on such understanding, the technical solution in embodiments of the present disclosure can be reflected in a form of a software product in essence or in the part of making a contribution to the prior art. The computer software product is stored in a storage medium, including several instructions to enable one computer device (may be a personal computer, a server or a network device, etc.) to execute all or some of the methods of various embodiments of the present disclosure. The foregoing storage medium includes: various mediums such as a USB flash disk, a mobile hard disk, a read-only memory ROM, a random access memory RAM, a magnetic disc or a compact disc, etc. which can store program coeds. In this way, embodiments of the present disclosure are not limited to any specific hardware and software combination.

Accordingly, embodiments of the present disclosure further provide a computer storage medium, in which a computer program is stored, the computer program is used for executing the multimedia data backup method in embodiments of the present disclosure.

The above are just embodiments of the present disclosure and is not intended to limit the protection scope of the present disclosure.

INDUSTRIAL APPLICABILITY

The method in embodiments of the present disclosure is applied to a user terminal having a storage medium and including a display unit which has a display area, the method includes: triggering a first user operation, which is used for acquiring configuration data; displaying the configuration data in the display area in response to the first user operation, and selecting a backup mode from the configuration data; triggering a second user operation, which is used for executing data backup processing corresponding to the backup mode; and searching multimedia data corresponding to the backup mode in response to the second user operation, and backing up the multimedia data to the storage medium when it is detected that an amount of free storage space of the storage medium is matched with an amount of the searched multimedia data. By means of embodiments of the present disclosure, since no specific storage format limitation is involved in the backup process, only corresponding multimedia data backup processing is required to be executed according to a backup mode in the configuration data, so as to store the multimedia data in the storage medium of the user terminal. Therefore, at least a problem of being limited by contact person formats is solved, so that multimedia data can be stored, and requirements of frequent backup and transmission of users can also be met.

What is claimed is:

1. A multimedia data backup method applied to a user terminal having a storage medium and including a display unit which has a display area, comprising:
    triggering a first user operation, which is used for acquiring configuration data;
    displaying the configuration data in the display area in response to the first user operation, and selecting a backup mode from the configuration data;
    triggering a second user operation, which is used for executing data backup processing corresponding to the backup mode; and
    searching multimedia data corresponding to the backup mode in response to the second user operation, and backing up the multimedia data to the storage medium when it is detected that an amount of free storage space of the storage medium is matched with an amount of the searched multimedia data.

2. The method of claim 1, wherein displaying the configuration data in the display area specifically comprises: displaying the configuration data in a form of a function setting menu,
    the multimedia data at least comprises: contact person information, head portrait information corresponding to the contact person information, and a mapping relationship between the contact person information and the head portrait information.

3. The method of claim 2, wherein searching the multimedia data corresponding to the backup mode in response to the second user operation, and backing up the multimedia data to the storage medium when it is detected that an amount of free storage space of the storage medium is matched with an amount of the searched multimedia data specifically comprise:
    in the event that the backup mode is a full backup mode, searching to obtain multimedia data including all contact person information, head portrait information corresponding to the contact person information, and a mapping relationship between the contact person information and the head portrait information; and
    reading the storage medium after the search is completely executed or when the search is executed, detecting whether an amount of free storage space of the storage medium is matched with an amount of the multimedia data, backing up the multimedia data if the amount of free storage space is enough to back up data, and prompting in the display area that the amount of free storage space is not enough to back up data if the amount of free storage space is not enough to back up data.

4. The method of claim 2, wherein searching the multimedia data corresponding to the backup mode in response to the second user operation, and backing up the multimedia data to the storage medium when it is detected that the amount of free storage space of the storage medium is matched with the amount of the searched multimedia data specifically comprise:
    in the event that the backup mode is a selective backup mode, displaying a menu at a next level of the selective backup mode in the display area, and displaying all contact person information in a form of a list to a user;
    acquiring an operation of ticking the contact person information by the user, and triggering a first instruction after it is detected that the operation is completely executed, wherein the first instruction operation is used for data backup processing for conducting selective backup on the ticked contact person information;
    searching to obtain multimedia data including ticked contact person information, head portrait information corresponding to the contact person information, and a mapping relationship between the contact person information and the head portrait information in response to the first instruction according to the ticked contact person information; and
    reading the storage medium after the search is completely executed or when the search is executed, detecting whether the amount of free storage space of the storage medium is matched with the amount of the multimedia data, backing up the multimedia data if the amount of free storage space is enough to back up data, and prompting in the display area that the amount of free storage space is not enough to back up data if the amount of free storage space is not enough to back up data.

5. The method of claim 2, further comprising: triggering a third user operation after the storage medium located in the user terminal is placed into another user terminal, wherein the third user operation is used for selecting a contact person synchronization mode from the configuration data; and
    synchronizing the multimedia data backed up in the storage medium to another user terminal in response to the third user operation, taking the contact person information in the multimedia data as newly added cellphone contact person information, and executing mapping relationship matching on the contact person information and the head portrait information corresponding to the contact person information according to the mapping relationship between the contact person information and the head portrait information.

6. The method of claim 3, further comprising: triggering a third user operation after the storage medium located in the user terminal is placed into another user terminal, wherein the third user operation is used for selecting a contact person synchronization mode from the configuration data; and synchronizing the multimedia data backed up in the storage medium to another user terminal in response to the third user operation, taking the contact person information in the multimedia data as newly added cellphone contact person information, and executing mapping relationship matching on the contact person information and the head portrait information corresponding to the contact person information according to the mapping relationship between the contact person information and the head portrait information.

7. The method of claim 4, further comprising: triggering a third user operation after the storage medium located in the user terminal is placed into another user terminal, wherein the third user operation is used for selecting a contact person synchronization mode from the configuration data; and synchronizing the multimedia data backed up in the storage medium to another user terminal in response to the third user operation, taking the contact person information in the multimedia data as newly added cellphone contact person information, and executing mapping relationship matching on the contact person information and the head portrait information corresponding to the contact person information according to the mapping relationship between the contact person information and the head portrait information.

8. The method of claim 1, further comprising: triggering a third user operation after the storage medium located in the user terminal is placed into another user terminal, wherein the third user operation is used for selecting a contact person synchronization mode from the configuration data; and synchronizing the multimedia data backed up in the storage medium to another user terminal in response to the third user operation, taking the contact person information in the multimedia data as newly added cellphone contact person information, and executing mapping relationship matching on the contact person information and the head portrait information corresponding to the contact person information according to the mapping relationship between the contact person information and the head portrait information.

9. A user terminal having a storage medium and comprising a display unit which has a display area, comprising:

a first trigger unit configured to trigger a first user operation, which is used for acquiring configuration data;

a first response unit configured to display the configuration data in the display area in response to the first user operation, and select a backup mode from the configuration data;

a second trigger unit configured to trigger a second user operation, which is used for executing data backup processing corresponding to the backup mode; and a second response unit configured to search multimedia data corresponding to the backup mode in response to the second user operation, and back up the multimedia data to the storage medium when it is detected that an amount of free storage space of the storage medium is matched with an amount of the searched multimedia data.

10. The user terminal of claim 9, wherein the second response unit further comprises:

a first processing subunit configured to search, in the event that the backup mode is a full backup mode, to obtain multimedia data including all contact person information, head portrait information corresponding to the contact person information, and a mapping relationship between the contact person information and the head portrait information; and a first detection subunit configured to read the storage medium after the search is completely executed or when the search is executed, detect whether an amount of free storage space of the storage medium is matched with an amount of the multimedia data, back up the multimedia data if the amount of free storage space is enough to back up data, and prompt in the display area that the amount of free storage space is not enough to back up data if the amount of free storage space is not enough to back up data.

11. The user terminal of claim 9, wherein the second response unit further comprises:

a second processing subunit configured to display, in the event that the backup mode is a selective backup mode, a menu at a next level of the selective backup mode in the display area, and display all contact person information in a form of a list to a user;

a second detection subunit configured to acquire an operation of ticking the contact person information by the user, and trigger the first instruction after it is detected that the operation is completely executed, wherein the first instruction operation is used for executing data backup processing for conducting selective backup on the ticked contact person information;

an instruction response subunit configured to search to obtain multimedia data including ticked contact person information, head portrait information corresponding to the contact person information, and a mapping relationship between the contact person information and the head portrait information in response to the first instruction according to the ticked contact person information; and a third detection subunit configured to read the storage medium after the search is completely executed or when the search is executed, detect whether the amount of free storage space of the storage medium is matched with the amount of the multimedia data, back up the multimedia data if the amount of free storage space is enough to back up data, and prompt in the display area that the amount of free storage space is not enough to back up data if the amount of free storage space is not enough to back up data.

12. A user terminal comprising a display unit which has a display area, comprising:

a synchronization trigger unit configured to trigger a third user operation after a storage medium in the user terminal for implementing data backup processing is placed into the present user terminal, wherein the third user operation is used for selecting a contact person synchronization mode from configuration data; and the configuration data are displayed in the display area in a form of a function setting menu; and a synchronization response unit configured to synchronize the multimedia data backed up in the storage medium to the present user terminal in response to the third user operation, take the contact person information in the multimedia data as newly added cellphone contact person information, and execute mapping relationship matching on the contact person information and the head portrait information corresponding to the contact person information according to the mapping relationship between the contact person information and the head portrait information.

\* \* \* \* \*